Oct. 11, 1949.  B. C. ROEHRL  2,484,248
FILM CARTRIDGE
Filed Feb. 12, 1946
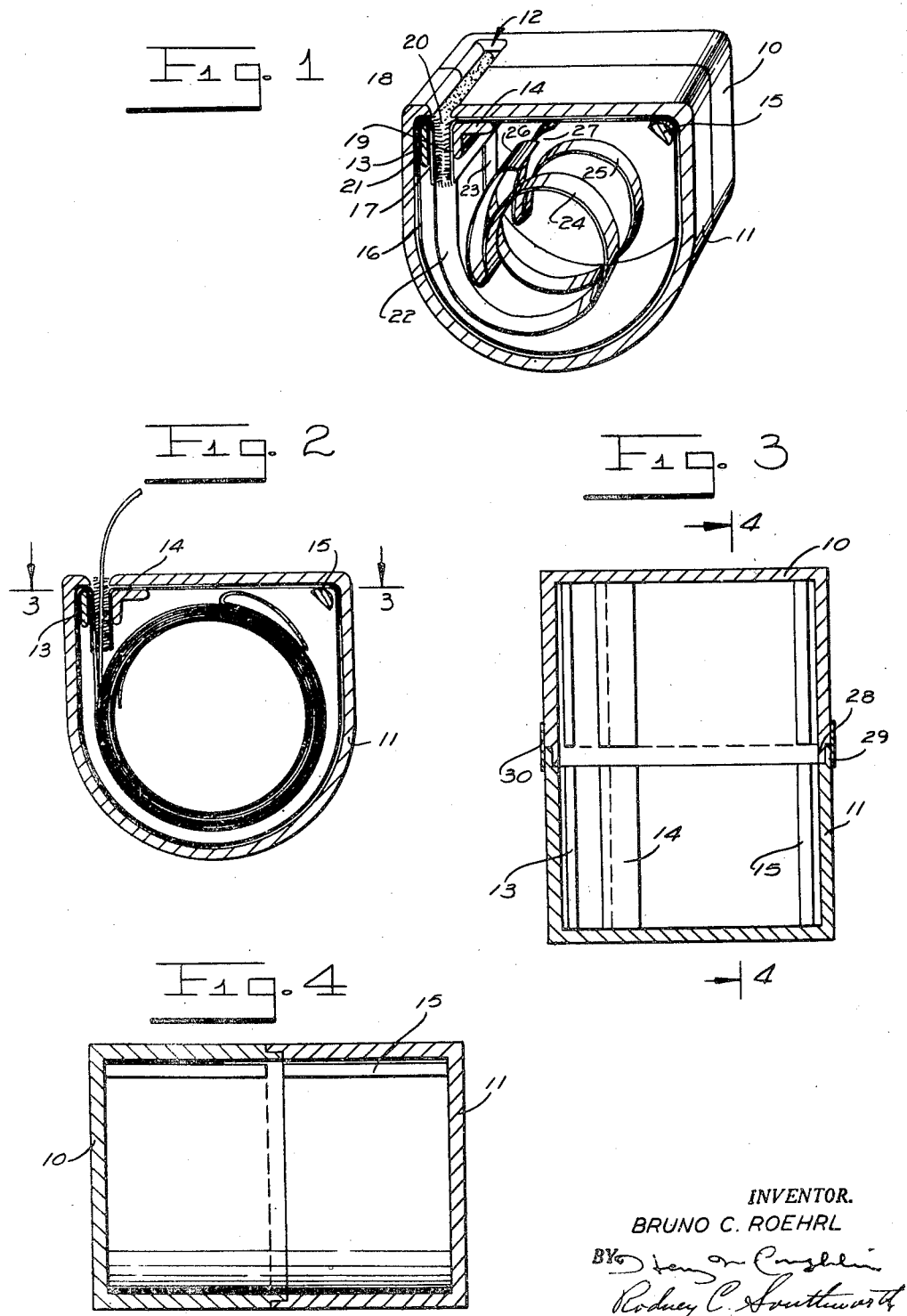
INVENTOR.
BRUNO C. ROEHRL
BY
ATTORNEYS Patented Oct. 11, 1949

2,484,248

UNITED STATES PATENT OFFICE 2,484,248

FILM CARTRIDGE

Bruno C. Roehrl, Erie, Pa., assignor to General Aniline & Film Corporation, New York, N. Y., a corporation of Delaware Application February 12, 1946, Serial No. 647,175

5 Claims. (Cl. 242—71)

1

This case pertains to an invention in film cartridges, more particularly, that type of cartridge known in the trade as the "Memo" cartridge. United States Patents 1,094,401 and 1,799,184 show examples of cartridges of this type, the same having heretofore been fabricated from wood and from metals.

Among the objects of the invention is that of devising a cartridge which shall be adapted to be molded from plastic material and the shell of which shall be formed from two parts.

Another object of the invention is to form such a cartridge from plastic material by a simple molding process wherein the two parts comprising the cartridge shell itself are adapted to be assembled by moving the parts into abutting relationship and then light-sealing the joint between them by means of tape or other adhesive material.

Another object of the invention is that of forming the cartridge shell parts by a simple molding operation during which certain internal projections are formed, the purpose of which is that of holding in operative position a cartridge liner, light-sealing material and a metallic spring film guide used in this particular type of film holder.

Other objects of the invention will appear as the disclosure progresses.

According to the practice prior to development of the cartridge herein described and claimed, "Memo" type cartridges have been produced almost exclusively from steel or other metals. That involves a three-part enclosure, the holder and caps or end pieces. The material used must be fairly substantial and thus the weight of a steel "Memo" cartridge is greater than desired. By forming the holder from plastic which is adapted to a simple molding operation, reduction in cost, decrease of the number of parts from three to two, and effective light-sealing of the film are more easily realized. Loading of these cartridges is done in complete darkness for most types of film, and one of the advantages of the present construction is that the cartridges are easily produced so that they conform to close tolerances, thereby facilitating the assembly and loading operations. Actual work involved in assembling the cartridge itself is cut to a minimum since the spring, the liner and light-sealing devices are all easily placed in one-half of the cartridge shell, whereupon the assembly is completed by slipping on the other shell member, pushing the parts into properly abutting relationship and temporarily locking them in that position by application of an adhesive strip at the joint or by some other means of sealing such as by application of heat locally

2 in the event the parts are adapted to being united thermo-plastically.

The invention will be described by reference to one specific embodiment thereof which is to be understood as illustrative and is not to be interpreted in a limiting sense. The following description makes reference to the accompanying figures of drawing, in which:

Fig. 1 is an isometric view, certain parts being in section, illustrating the cartridge in its finally assembled form, but without film.

Fig. 2 is a section similar to that of Fig. 1, but not in isometric, the film being in position, that is, the cartridge being loaded for use.

Fig. 3 is a section taken at line 3—3, Fig. 2, this view showing only the molded plastic parts.

Fig. 4 is a similar section, but taken at line 4—4, Fig. 3.

Now referring to Figs. 1 and 2, the cartridge is made up from a two-part shell having the parts 10 and 11 which, as herein illustrated, are of equal length. It is not essential that these parts be of equal length and the division between the two may come at any convenient point. These shell parts are molded from plastic material and may be molded by any convenient method which is cheap and by which the parts may be formed with a reasonable degree of accuracy. The shell members have an opening or slot generally indicated by numeral 12, through which film is drawn or through which it is pushed, depending upon whether the cartridge is loaded with fresh film or whether it is the receiving cartridge in the camera. The shell members also have molded integrally with each half, three projections numbered 13, 14 and 15. These are numbered at one-half only of the shell, but it is to be understood that similar aligning projections are also provided in the other half. The projections serve to maintain in position a liner strip 16 which is bent about the projection 13 at one end and which is extended inwardly as at 17 far enough to serve as a support for plush or other light-excluding and film-protecting material 18. The liner 16 is preferably made of paper, cardboard, or thin metal and extends around the inner surface of the cartridge passing about projection 15 at the opposite corner and then over the angular projection 14 to extend down as at 19 to support similar plush material 20 for completing the light-seal and for protecting the opposite side of the film as the same is withdrawn from or pushed into the cartridge. It is to be understood that the projections 13, 14, and 15 duplicated at both ends of the cartridge shell support the liner at its opposite ends.

In this type of cartridge, a resilient strip metal spring serves to tension the coil of film as it is withdrawn, and also serves to guide and to control the size of the film coil as it is pushed into the receiving cartridge. Here, such a metal spring is bent about the projections 13 extending around the liner 16 as at 21. At that side of the projections and liner, the spring continues across the entire length of the cartridge, but has elongated strips 22 and 23 only, which project inwardly over the plush 18 at either end thereof and extend down, forming the resilient loops 24 and 25 by which the film coil is maintained at a diameter sufficiently small as it is introduced into the cartridge so that when a complete length of film, e. g., that length of film necessary for 36 exposures on 35 mm. material, is coiled as shown in Fig. 2, it will nearly fill the interior of the cartridge. The strip material of the loops 24 and 25 continues back in a reverse bend as shown in Fig. 1 and these oppositely-directed, arcuate spring elements 26 and 27 prevent interference or binding of the ends of the loops 24 and 25 as the film is first introduced.

At the ends, the spring strips 22 and 23 overlie the plush light-seal 18, that is, at the ends of the film opening 12, and, of course, as is the practice in this type of cartridge, the springs engage the film only at the edges or beyond the picture area. They also only touch the film at its back at the edges and at the perforated portion, and that can do no serious damage.

In Figs. 3 and 4, sections of the shell only show the manner in which the two parts may be joined. Here, the part 10 is provided with a tongue 28 over which engages the flange 29 extending from the opposite part 11. These would naturally effect a light-seal which would probably be sufficient for the purpose, but one simple manner in which additional light-sealing means is provided and also locking of the two parts accomplished, is that of applying a strip of tape 30. The tape 30 (not shown in the other views) extends about the joint between the two parts except that it is discontinued at either side of the slot 12. Ordinary photographic binding tape may be used, or any of the materials generally known as Scotch tape are equally suitable.

If desired, other joints may be used and, in fact, the two parts 10 and 11 may merely abut against each other and be maintained in position by the tape 30. In the actual assembly of the parts, the liner 16 is bent to shape and the spring clip placed in position with respect to the liner. Then these parts are pushed into position in one-half of the shell, engaging about the projections 13, 14 and 15, as shown and described, the light-sealing material 18 and 20 previously having been adhered to the ends of the liner. Then the opposite part of the shell is pushed into place, the projections 13, 14 and 15 being rounded at their ends so as to engage properly within the lining material, etc., although the assembly is not difficult and need not be done in darkness. When assembled, the tape 30 may be applied.

The projections 13, 14 and 15 need only be long enough to engage and properly support the lining material and the spring clip. In some instances, it may be more satisfactory to have these projections longer in one-half of the shell than in the other. Here projections in one end only have been numbered, it being understood that those in the opposite end are similarly disposed, although they may be of different length.

With plastic materials adapted to be joined by application of heat, the two parts may be fused at points and thereby locked in position, the need for a tape 30 being done away with so long as the joint between the two shell members is of a type to exclude light.

The cartridge may be made in any size for accommodating roll film. 35 mm. film is commonly sold in such cartridges, but it is to be understood that the invention is not so limited.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A film cartridge of the type adapted to have film pulled from or pushed into a coil enclosed therein, having in combination a molded, plastic, two-part shell, a liner and a spring film guide member, the said shell being formed of opposed parts having an interconnecting joint adjacent the center of the cartridge, and further having at either end integrally formed projections, one said projection having wrapped thereabout one end of the said liner and the spring film guide member, another of said projections at the opposite side of the shell serving to maintain the liner in position adjacent the shell wall, and the third of said projections having the liner passing thereabout, the said first and third projections being closely adjacent so that the opposite ends of the liner are held in spaced parallel relationship to support light-sealing and film-protecting material adhered thereto.

2. A film cartridge adapted to have film pulled from or pushed into a coil enclosed therein, having in combination a molded, plastic, two-part shell, a liner and a spring film guide member, said shell having interconnecting means including a light-sealing joint and a tape adhered to the outer surface of said shell about the said joint, a film slot at one side of the said shell and a plurality of projections within the shell including projections at either side of the said film slot, one of said projections having one end of the liner wrapped thereabout and also serving to support the spring guide member, the other of said projections supporting the opposite end of said liner in parallel relationship to that first mentioned, thereby to provide a space opposite the film slot within which light-sealing and film-protecting material may be held in position.

3. A film cartridge of the type adapted to have film pulled from or pushed into a coil enclosed therein, having in combination a molded, plastic, two-part shell, and a spring film guide member, the said shell being formed of opposed parts having a film slot and at either end integrally formed projections adjacent said slot, one said projection having wrapped thereabout the bent end of the spring film guide member, the other projection at the opposite side of said shell slot having affixed thereto a backing for light excluding and film contacting material, and similar light excluding material attached to said spring film guide member and opposed to and cooperating with the light excluding material first mentioned.

4. A film cartridge of the type adapted to have film pulled from or pushed into a coil enclosed therein, having in combination a molded, plastic, two-part shell, a liner and a spring film guide member, the said shell being formed of opposed parts having an interconnecting joint adjacent the center of the cartridge and further having a film slot at one side, and adjacent said slot and projecting from each end of the shell members, integrally formed supports one of which at one side of said slot has affixed thereto an end of said spring film guide member, and overlying said supports and the adjacent portion of said spring film guide members, a plush, light excluding strip, and at the opposite side of said slot and attached to said supports from the shell, a backing member and light excluding plush material.

5. A film cartridge of the type adapted to have film pulled from or pushed into a coil enclosed therein, having in combination a molded, plastic, two-part shell, a liner and a spring film guide member, said shell having an interconnecting joint including a light sealing means adhered to the outer surface of the shell about said joint, a film slot at one side of the shell, and a plurality of integrally cast projections within the shell and extending from the ends toward the center thereof, two of said projections being positioned adjacent the said slot and another of said projections at the opposite side of the shell from said slot, said spring film guide member comprising spaced coils within the shell and an interconnecting, bent portion wrapped about one of said supports adjacent the film slot, the said liner comprising strip material passing about the interior circumferential portion of said cartridge and terminating at either end adjacent the film slot to be supported by the projections thereat, said liner having at those ends adjacent the film slot light excluding and film protecting material.

BRUNO C. ROEHRL.

REFERENCES CITED

The following references are of record in the file of this patent:

UNITED STATES PATENTS

| Number | Name | Date |
| --- | --- | --- |
| 1,694,401 | Slocum | Dec. 11, 1928 |
| 1,799,184 | Slocum et al. | Apr. 7, 1931 |
| 2,153,573 | Kinloch | Apr. 11, 1939 |
| 2,284,487 | Hineline | May 26, 1942 |
| 2,303,173 | Roehrl | Nov. 24, 1942 |
| 2,381,033 | Bolsey | Aug. 7, 1945 |

FOREIGN PATENTS

| Number | Country | Date |
| --- | --- | --- |
| 454,434 | Great Britain | Sept. 30, 1936 |
| 462,525 | Great Britain | Mar. 10, 1937 |
| 469,773 | Great Britain | Aug. 3, 1937 |
| 826,152 | France | Dec. 27, 1937 |